(12) United States Patent
Kruempelmann et al.

(10) Patent No.: US 10,846,078 B2
(45) Date of Patent: Nov. 24, 2020

(54) SYNCHRONIZATION OF MASTER DATA ACROSS MULTIPLE CLOUD-BASED SYSTEMS

(71) Applicant: SAP SE, Walldorf (DE)

(72) Inventors: Wulf Kruempelmann, Altlussheim (DE); Barbara Freund, Heidelberg (DE)

(73) Assignee: SAP SE, Walldorf (DE)

( * ) Notice: Subject to any disclaimer, the term of this patent is extended or adjusted under 35 U.S.C. 154(b) by 3 days.

(21) Appl. No.: 16/182,368

(22) Filed: Nov. 6, 2018

(65) Prior Publication Data
US 2020/0142684 A1    May 7, 2020

(51) Int. Cl.
| | |
|---|---|
| *G06F 9/44* | (2018.01) |
| *G06F 8/65* | (2018.01) |
| *G06F 16/22* | (2019.01) |
| *H04L 29/08* | (2006.01) |
| *G06F 16/27* | (2019.01) |
| *G06F 16/23* | (2019.01) |

(52) U.S. Cl.
CPC ............ *G06F 8/65* (2013.01); *G06F 16/2282* (2019.01); *G06F 16/2379* (2019.01); *G06F 16/27* (2019.01); *H04L 67/10* (2013.01); *H04L 67/34* (2013.01)

(58) Field of Classification Search
CPC ........ G06F 8/65; G06F 16/2282; G06F 16/27; G06F 16/2379; H04L 67/10; H04L 67/34
See application file for complete search history.

(56) References Cited

U.S. PATENT DOCUMENTS

| | | | |
|---|---|---|---|
| 2014/0040182 A1* | 2/2014 | Gilder | G06F 17/2264 707/602 |
| 2015/0261782 A1* | 9/2015 | McFerrin | G06F 16/178 707/625 |
| 2015/0378716 A1* | 12/2015 | Singh | H04W 4/60 717/172 |
| 2019/0102280 A1* | 4/2019 | Caldato | H04L 67/10 |

* cited by examiner

Primary Examiner — Lewis A Bullock, Jr.
Assistant Examiner — Tina Huynh
(74) Attorney, Agent, or Firm — Mintz Levin Cohn Ferris Glovsky and Popeo, P.C.

(57) ABSTRACT

A method may include detecting, at a development system hosting a first software application, a change to a first database table storing a master data associated with the first software application. The change may correspond to a customization applied to the first software application. The master data may include data objects that the first software application requires for performing a function of the first software application. In response to detecting the change to the first database table, the change may be applied to a second database table storing a replica of the master data. A transport request may be generated to include the customization and at least a portion of the second database table including the change. The transport request may be sent to a production system hosting a second software application to deploy the customization at the production system. Related systems and articles of manufacture are also provided.

15 Claims, 5 Drawing Sheets

FIG. 5

SYNCHRONIZATION OF MASTER DATA ACROSS MULTIPLE CLOUD-BASED SYSTEMS

TECHNICAL FIELD

The present disclosure generally relates to cloud-computing and, more specifically, to the synchronization of master data.

BACKGROUND

An application may be hosted by a cloud-computing platform such that the application may be remotely accessible to multiple tenants, for example, over the Internet. For example, the application may be available as a cloud-based service including, for example, a software as a service (SaaS) and/or the like. Many organizations may rely on such cloud-based software applications including, for example, enterprise resource planning (ERP) software, customer relationship management (CRM) software, and/or the like. These cloud-based applications may provide a variety of data processing functionalities including, for example, procurement, payroll, time and attendance management, recruiting and onboarding, learning and development, performance and compensation, workforce planning, and/or the like.

SUMMARY

Methods, systems, and articles of manufacture, including computer program products, are provided for synchronization of master data between a development system and a production system. In one aspect, there is provided a system including at least one processor and at least one memory. The at least one memory can store instructions that cause operations when executed by the at least one processor. The operations may include: detecting, at a development system hosting a first software application, a change to a first database table storing a first master data associated with the first software application, the change corresponding to a customization applied to the first software application, and the master data comprising data objects that the first software application requires for performing at least one function of the first software application; in response to detecting the change to the first database table, applying the change to a second database table storing a replica of the first master data; generating a transport request to include the customization and at least a portion of the second database table including the change; and sending, to a production system hosting a second software application, the transport request in order to deploy the customization at the production system.

In some variations, one or more of the features disclosed herein including the following features can optionally be included in any feasible combination. The first software application may operate on the first master data stored in the first database table in order to perform the at least one function. The performance of the at least one function may generate transaction data that is stored in a third database table.

In some variations, the change may be detected by a database trigger coupled with the first database table. The database trigger may include an insertion trigger and/or an update trigger. The change may include an insertion and/or an update of at least one data object in the first database table.

In some variations, a notification that the transport request is being sent may be sent to the production system prior to sending the transport request. The transport request may be sent to the production system in response to the production system successfully verifying contents of the transport request. A corrected transport request may be sent to the production system in response to the production system determining that a portion of the second database table storing the replica of first master data required for the second software application to operate in accordance with the customization is absent from the transport request. The corrected transport request may include the portion of the second database table absent from the transport request.

In some variations, the first software application and the second software application may be different instances of a same cloud-based software application.

In some variations, the development system and the production system may be deployed on a same cloud-computing platform or different cloud-computing platforms.

In some variations, the deploying of the customization at the production system may include synchronizing, with the first master data, a second master data associated with the second software application.

In some variations, the transport request may include at least the portion of the second database table instead of base data for recreating, at the production system, the first database table corresponding to the first master data.

In another aspect, there is provided a method for synchronization master data between a development system and a production system. The method may include: detecting, at a development system hosting a first software application, a change to a first database table storing a first master data associated with the first software application, the change corresponding to a customization applied to the first software application, and the master data comprising data objects that the first software application requires for performing at least one function of the first software application; in response to detecting the change to the first database table, applying the change to a second database table storing a replica of the first master data; generating a transport request to include the customization and at least a portion of the second database table including the change; and sending, to a production system hosting a second software application, the transport request in order to deploy the customization at the production system.

In some variations, one or more of the features disclosed herein including the following features can optionally be included in any feasible combination. The first software application may operate on the first master data stored in the first database table in order to perform the at least one function. The performance of the at least one function may generate transaction data that is stored in a third database table.

In some variations, the change may be detected by a database trigger coupled with the first database table. The database trigger may include an insertion trigger and/or an update trigger. The change may include an insertion and/or an update of at least one data object in the first database table.

In some variations, the method may further include: sending, to the production system, a notification that the transport request is being sent prior to sending the transport request; and sending, to the production system, the transport request in response to the production system successfully verifying contents of the transport request.

In some variations, the method may further include sending, to the production system, a corrected transport request in response to the production system determining that a portion of the second database table storing the replica of first master data required for the second software application to operate in accordance with the customization is absent from the transport request. The corrected transport request may include the portion of the second database table absent from the transport request.

In some variations, the first software application and the second software application may be different instances of a same cloud-based software application.

In some variations, the development system and the production system may be deployed on a same cloud-computing platform or different cloud-computing platforms.

In some variations, the deploying of the customization at the production system may include synchronizing, with the first master data, a second master data associated with the second software application.

In some variations, the transport request may include at least the portion of the second database table instead of base data for recreating, at the production system, the first database table corresponding to the first master data.

In another aspect, there is provided a computer program product that includes a non-transitory computer readable medium. The non-transitory computer readable medium may store instructions that cause operations when executed by at least one data processor. The operations may include: detecting, at a development system hosting a first software application, a change to a first database table storing a first master data associated with the first software application, the change corresponding to a customization applied to the first software application, and the master data comprising data objects that the first software application requires for performing at least one function of the first software application; in response to detecting the change to the first database table, applying the change to a second database table storing a replica of the first master data; generating a transport request to include the customization and at least a portion of the second database table including the change; and sending, to a production system hosting a second software application, the transport request in order to deploy the customization at the production system.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the synchronization of master data, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, like labels are used to refer to same or similar items in the drawings.

DETAILED DESCRIPTION

A cloud-based software application may operate on data stored in one or more database tables. For instance, the cloud-based software application may operate on data stored in the one or more database tables in order to perform a function. While performing that function, the cloud-based software application may generate data that may be stored in additional database tables. At least a portion of the data that the cloud-based software application operates on may constitute master data. As used herein, master data may include data objects required for the performance of a function. Meanwhile, transaction data may refer to the data that is generated due to the performance the function.

While transaction data tends to be volatile, master data may remain relatively static. Nevertheless, master data stored at different systems hosting different instances of the cloud-based software application may require synchronization in order to avoid discrepancies in the functions performed by each instance of the cloud-based software application. For example, the master data that is associated with customizations for the cloud-based software application must be transferred from the development system in which the customizations are created to the production system at which the customizations are deployed. Accordingly, a master data engine may be configured to coordinate the transfer the master data between different systems including, for example, from a development system to a production system.

In some example embodiments, the master data engine may be deployed at a development system hosting an instance of the cloud-based software application. When one or more customizations created for the cloud-based software application are being deployed to a production system hosting another instance of the cloud-based software application, the master data engine may be configured to coordinate the transfer of master data associated with the customizations. The customizations for the cloud-based software application may be associated with modifications to a master data stored at the development system including, for example, changes to one or more database tables corresponding to the master data. As such, the master data engine may include one or more database triggers configured to detect the modifications to one or more database tables storing the master data and apply the same modifications to one or more shadow database tables storing a replica of the master data. Moreover, at least a portion of the replica of the master data that is associated with the customizations may be included in a transport request sent to the production system for deploying the customizations to the production system.

In some example embodiments, a transport controller at the production system may be configured to verify the contents of the transport request from the development system before accepting the transport request and deploying the one or more customizations included in the transport request at the production system. The transport controller may be configured to determine, for instance, whether one or more errors are present in the transport request that would prevent the one or more customizations from being successfully deployed to the production system. For example, the one or more errors may include an absence of master data that is required for the cloud-based software application at the production system to operate in accordance with the customizations.

In some example embodiments, the replica of the master data included in the transport request may enable the transport controller to determine whether one or more errors are present in the transport request. Otherwise, the transport controller may be required to recreate the master data before being able to verify the contents of the transport request. By verifying the contents of the transport request, the transport controller may prevent a transport request containing errors from being accepted at the production system. Moreover, the transport controller may send, to the development system, a request to modify the transport request to correct the errors that are present in the transport request. For instance, the transport controller may request the development system to extend the transport request to include master data that is absent from the transport request but is required for the deployment of the one or more customizations to the production system.

Figure 1:
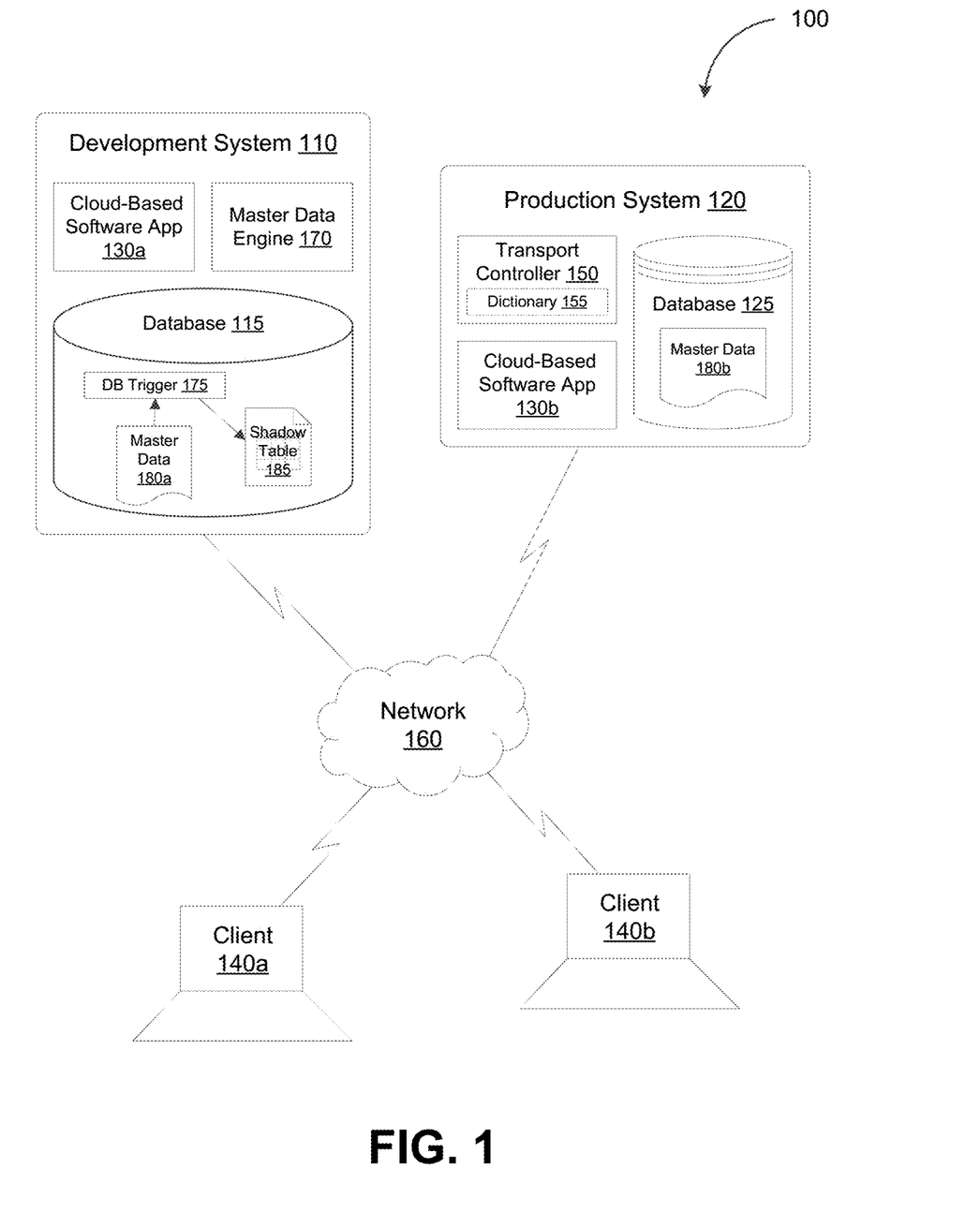
FIG. 1 depicts a system diagram illustrating a configuration data transport system, in accordance with some example embodiments.

FIG. 1 depicts a system diagram illustrating a configuration data transport system 100, in accordance with some example embodiments. Referring to FIG. 1, the configuration data transport system 100 may include a development system 110, a production system 120, a first client 140a, and a second client 140b. As shown in FIG. 1, the development system 110, the production system 120, the first client 140a, and the second client 140b may be communicatively coupled via a network 160. It should be appreciated that the network 160 may be any wired and/or wireless network including, for example, a wide area network (WAN), local area network (LAN), a virtual local area network (VLAN), the Internet, and/or the like. Moreover, the development system 110 and/or the production system 120 may be cloud-based systems hosted on a same cloud-computing platform or different cloud-computing platforms.

Referring again to FIG. 1, the development system 110 may host a first cloud-based software application 130a while the production system 120 may host a second cloud-based software application 130b. The first cloud-based software application 130a and the second cloud-based software application 130b may be instances of the same cloud-based application including, for example, an enterprise resource planning (ERP) software application, a customer relationship management (CRM) software application, a supply chain management (SCM) software application, and/or the like. Accordingly, the first cloud-based software application 130a and the second cloud-based software application 130b may provide a variety of data processing functions including, for example, procurement, payroll, time and attendance management, recruiting and onboarding, learning and development, performance and compensation, workforce planning, and/or the like.

A developer associated with the first client 140a may access the development system 110 in order to develop one or more customizations for the first cloud-based software application 130a, thereby adding, removing, and/or modifying at least some of the functions of the first cloud-based software application 130a. For example, these customizations may change one or more database tables storing data that is operated upon by the first cloud-based software application 130a while performing one or more functions. Deploying these customizations may include applying the customizations to the second cloud-based software application 130b at the production system 130. A customer associated with the second client 140b may access the production system 120 in order to utilize one or more of the functions provided by the second cloud-based software application 130b. The customizations that are applied to the second cloud-based software application 130b may add, remove, and/or modify at least some of the corresponding functions at the second cloud-based software application 130b.

In some example embodiments, the first cloud-based software application 130a may operate on a first master data 180a, which may be stored in one or more database tables in a first database 115 at the development system 110. The first master data 180a may include one or more data objects that the first cloud-based software application 130a requires to perform a function such as, for example, procurement, payroll, time and attendance management, recruiting and onboarding, learning and development, performance and compensation, workforce planning, and/or the like. Accordingly, the customizations for the first cloud-based software application 130a may be developed based on the first master data 180a. Moreover, the customizations for the first cloud-based software application 130a may be associated with modifications to the first master data 180a. Thus, in order for these customizations to be deployed at the production system 120 and applied to the second cloud-based software application 130b, a second master data 180b at the production system 120 may be synchronized with the first master data 180a at the development system 110 such that the second master data 120b also includes the same modifications that are applied to the first master data 180a.

Figure 2A:
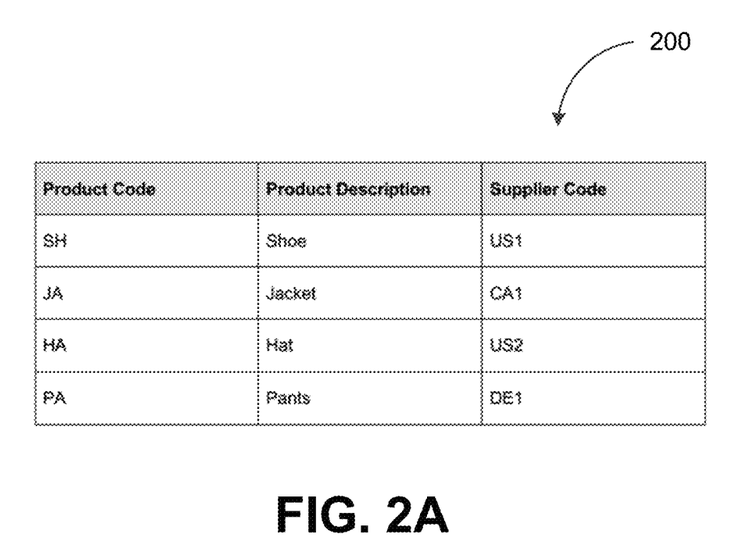
FIG. 2A depicts a database table storing an example of master data, in accordance with some example embodiments.

In some example embodiments, the first master data 180a and the second master data 180b may each be stored in one or more database tables. To further illustrate, FIG. 2A depicts a database table 200 storing an example of master data, in accordance with some example embodiments. As noted, master data may include one or more data objects required for the performance of a function, for example, by the first cloud-based software application 130a and/or the second cloud-based software application 130b. The example of master data stored in the database table 200 shown in FIG. 2A may include data objects that correspond to products. Accordingly, each data object in the database table 200 may include one or attributes of the corresponding product including, for example, a product code, a product description, and a supplier code.

Figure 2B:
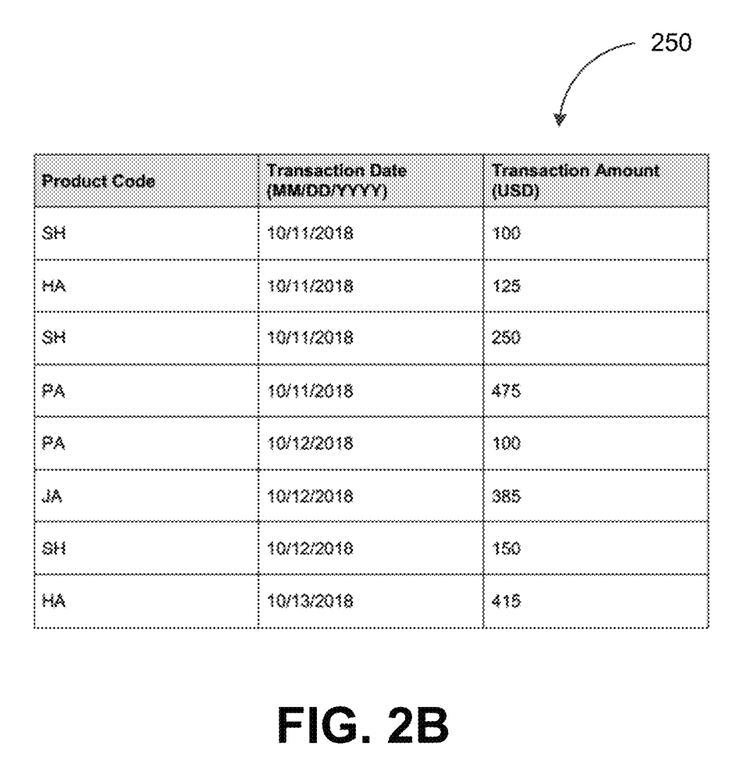
FIG. 2B depicts a database table storing an example of transactional data, in accordance with some example embodiments.

While master data may be required for the performance of a function by the first cloud-based software application 130a and/or the second cloud-based software application 130b, the performance of the function may generate transactional data that may be stored in additional database tables. For example, FIG. 2B depicts a database table 250 storing an example of transactional data, in accordance with some example embodiments. The example of transaction data stored in the database table 250 may be generated, for example, by the first cloud-based software application 130a and/or the second cloud-based software application 130b while performing a function using the example of master data stored in the database table 200. For instance, the database table 250 may store transactions purchasing one or more products corresponding to the data objects stored in the database table 200. As such, the database table 250 may include, for each transaction, a corresponding product code, transaction date, and transaction amount.

Referring again to FIG. 1, the customizations that are developed at the development system 110 may modify the first master data 180a including, for example, by applying one or more changes to the database tables storing the first master data 180a. In order to deploy these customizations at the production system 120, the same modifications may also be applied to the second master data 180b such that the second master data 180b is synchronized with the first master data 180a. Conventionally, instead of transferring the first master data 180a directly to the production system 120, the development system 110 may send, as part of a transport request for deploying one or more customizations at the production system 120, base data that may be used to recreate the first master data 180a at the production system 120. However, sending only base data to the production system 120 may prevent the production system 120 from verifying the contents of the transport request, for example, to determine if at least a portion of the master data associated with the customizations is absent from the transport request.

As such, in some example embodiments, the development system 110 may include a master data engine 170 configured to coordinate the transfer of at least a portion of the first master data 180a to the production system 120. For example, as shown in FIG. 1, the master data engine 170 may be associated with a database trigger 175. The database trigger 175 may be an insert trigger and/or an update trigger that is coupled with one or more database tables storing the first master data 180a. Accordingly, the database trigger 175 may be configured to detect changes to the one or more database tables storing the first master data 180a including, for example, the insertion of a data object, the update of a data object, and/or the like. Moreover, the database trigger 175 may apply the same changes to a shadow table 185 storing a replica of at least a portion of the first master data 180a.

In some example embodiments, in order to deploy, at the production system 120, the customizations developed at the development system 110, the production system 110 may send, to the production system 120, a transport request that includes the customizations. For example, when the developer associated with the first client 140a sends, to the development system 110, an indication that one or more customizations are to be deployed to the production system 120, the master data engine 170 may respond by at least generating a corresponding transport request that includes the one or more customizations. As noted, these customizations may add, remove, and/or modify at least some of the functions of the second cloud-based software application 130b including by changing at least some of the database tables storing data that is operated upon by the cloud-based software application. Accordingly, the customizations may require modifications to the second master data 180b, which the second cloud-based software application 130b may require in order to perform the functions affected by the customizations. That is, the first master data 180a and the second master data 180b may require synchronization such that the second master data 180b also includes the modifications that are applied to the first master data 180a as part of the customizations developed at the development system 110.

Thus, in some example embodiments, while generating the transport request that includes the one or more customizations, the master data engine 170 may be configured to include, in the transport request, at least a portion of the first master data 180a associated with the customizations. For example, the master data engine 170 may include, in the transport request, at least a portion of the shadow table 185 storing a replica of the first master data 180a. That portion of the shadow table 185 may include the changes (e.g., the insertions of data objects, the updates of data objects, and/or the like) that were applied to the database tables storing the first master data 180a. As noted, these changes may be associated with the customizations developed at the development system 110 based on the first master data 180a of the first cloud-based software application 130a.

In some example embodiments, including at least a portion of the shadow table 185 that includes the changes that are applied to the database tables storing the first master data 180a in the transport request sent to the production system 120 may enable the production system 120 to verify the contents of the transport request, for example, prior to accepting the transport request. For instance, the transport request may be sent from the development system 110 to the production system 120 in order to deploy, at the production system 120, one or more customizations that are created at the development system 110. A transport controller 150 at the production system 120 may be configured to verify the contents of the transport request before accepting the transport request and deploying, at the production system 120, the one or more customizations included in the transport request. For example, the transport controller 150 may be configured to determine, for instance, whether one or more errors are present in the transport request that would prevent the one or more customizations from being successfully deployed to the production system 120.

In some example embodiments, the transport controller 150 may include a data dictionary 155 storing data dependencies such as, for example, the dependency between data in a first database table and data in a second database table. Alternatively and/or additionally, upon receiving a transport request from the development system 110, the transport controller 150 may request for and/or receive, from the development system 110, at least a portion of the data dictionary 155 that is associated with the transport request. The data dictionary 155 may identify dependencies between data that is operated upon by the cloud-based software application and master data. For example, the data dictionary 155 may include keys that map entries from one database table storing master data to entries in another database table storing data that is operated upon by the cloud-based software application. Accordingly, when verifying a transport request from the development system 110, the transport controller 150 may identify, based at least on the data dictionary 155, the master data that is required for the second cloud-based software application 130*b* to operate in accordance with customizations affecting one or more other database tables.

In some example embodiments, the transport controller 150 may determine that the one or more errors present in the transport request from the development system 110 include, for example, the absence of at least a portion of the first master data 180*a* associated with the customizations that require synchronization with the second master data 180*b* at the production system 120. In response to detecting the absence of at least the portion of the first master data 180*a* associated with the customizations, the transport controller 150 may request that the development system 110 extend the transport request to include at least a portion of the first master data 180*a* associated with the customizations. The transport controller 150 may deploy the customizations included in the transport request once the development system 110 sends, to the production system 120, a corrected transport request that includes at least a portion of the first master data 180*a* associated with the customizations. As noted, in order to send at least a portion of the first master data 180*a* associated with the customizations, the development system 110, for example, the master data engine 170, may include, in the transport request, a corresponding portion of the shadow table 185.

Figure 3:
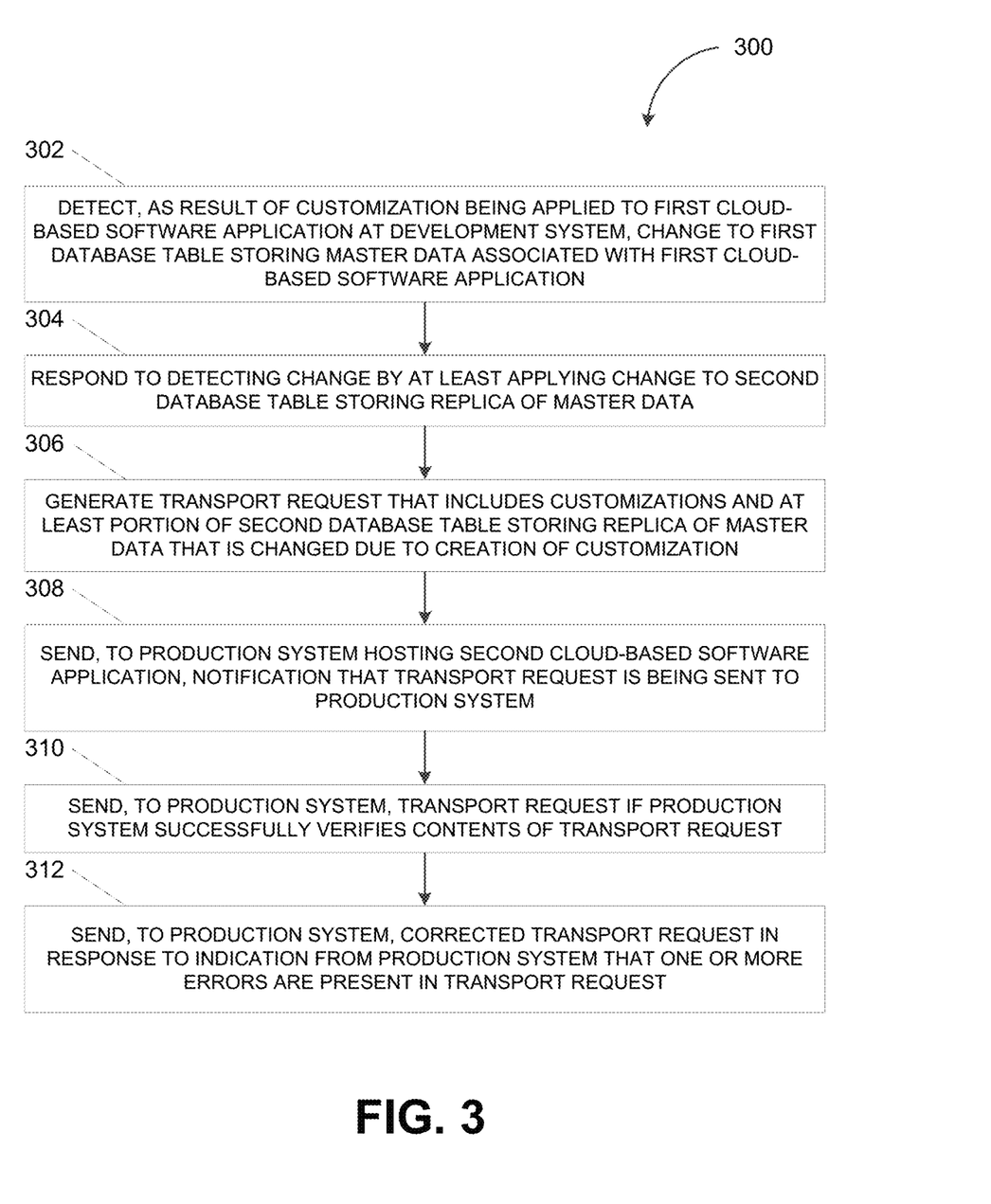
FIG. 3 depicts a flowchart illustrating a process for sending customizations from a development system to a production system, in accordance with some example embodiments.

FIG. 3 depicts a flowchart illustrating a process 300 for sending customizations from the development system 110 to the production system 120, in accordance with some example embodiments. Referring to FIGS. 1, 2A-B, and 3, the process 300 may be performed at the development system 110, for example, by the master data engine 170.

At 302, the master data engine 170 may detect, as a result of a customization being applied to the first cloud-based software application 130*a* at the development system 110, a change to a first database table storing the first master data 180*a* associated with the first cloud-based software application 130*a*. In some example embodiments, the master data engine 170 may include the database trigger 175 configured to detect changes to one or more database tables in the first database 115 that stores the first master data 180*a*. For example, the database trigger 175 may be an insert trigger that detects when a data object is inserted into the one or more database tables storing the first master data 180*a*. Alternatively and/or additionally, the database trigger 175 may be an update trigger that detects an update to a data object in the one or more database tables storing the first master data 180*a*.

The changes to the one or more database tables storing the first master data 180*a* may correspond to a customization that the developer associated with the first client 140*a* created for the first cloud-based software application 130*a* at the development system 110*a*. The first cloud-based software application 130*a* may be an instance of the same cloud-based software application as the second cloud-based software application 130*b* at the production system 120. Accordingly, the customization that is created at the development system 110*a* may be deployed to the production system 120 where it may be applied to the second cloud-based software application 130*b*. In doing so, the one or more functions of the first cloud-based software application 130*a* that is added, removed, and/or modified by the customization may be propagated to the second cloud-based software application 130*b* such that the same functions may also be added, removed, and/or modified for the second cloud-based software application 130*b*.

As noted, while performing one or more functions, the first cloud-based software application 130*a* and the second cloud-based software application 130*b* may each operate on data stored in one or more database tables and generate data stored in additional database tables. The first master data 180*a* and the second master data 180*b* may correspond to data that the first cloud-based software application 130*a* and the second cloud-based software application 130 require to perform one or more respective functions. Accordingly, the changes to the first master data 180*a* that are associated with the customizations that are created at the development system 110 for the first cloud-based software application 130*a* may be propagated to the production system 120 such that the second master data 180*b* may be synchronized with the first master data 180*a*. Synchronizing the first master data 180*a* and the second master data 180*b* may be required in order to apply the same customizations to the second cloud-based software application 130*b*.

At 304, the master data engine 170 may respond to detecting the change by at least applying the change to a second database table storing a replica of the first master data 180*a*. In some example embodiments, the database trigger 175 may respond to detecting the one or more changes to the first master data 180*a* by at least applying the same changes to the shadow table 185.

At 306, the master data engine 170 may generate a transport request that includes the customization and at least a portion of the second database table storing the replica of the first master data 180*a* that is changed due to the creation of the customization. For example, the master data engine 170 may generate a transport request that includes the customizations that the developer associated with the first client 140*a* has created at the development system 110 for the first cloud-based software application 130*a*. Deploying these customizations at the production system 120 may include sending the customizations to the production system 120 in a transport request. As noted, applying the same customizations to the second cloud-based software application 130*b* at the production system 120 may require the second master data 180*b* to be synchronized with the first master data 180*a*. Accordingly, the master data engine 170 may generate the transport request to include at least the portion of the shadow table 185 storing a replica of the portion of the first master data 180*a* affected by the customization applied to the first cloud-based software application 130*a*. It should be appreciated that sending at least the portion of the shadow table 185 storing the replica of the first master data 180*a* instead of base data for recreating the first master data 180*a* may enable the production system 120 to verify the transport request, for example, for the absence of the portion of the first master data 180*a* required for deploying the customization at production system 120, prior to accepting the transport request.

At 308, the master data engine 170 may send, to the production system 120 hosting the second cloud-based software application 130*b*, a notification that the transport request is to be sent to the production system 120. In some example embodiments, the master data engine 170 may send, to the production system 120, a notification of the upcoming transport request, thereby enabling the production system 120 to verify the transport request prior to accepting the transport request at the production system 120.

At 310, the master data engine 170 may send, to the production system 120, the transport request if the production system 120 successfully verifies the contents of the transport request. For example, the production system 120 may successfully verify the transport request if the production system 120 determines that the first master data 180*a* required for deploying the corresponding customizations at the production system 120 is present at the production system 120 and/or included as part of the transport request. In the event that the production system 120 is able to successfully verify the contents of the transport request, the production system 120 may request that the development system 110 send, to the production system 120, the transport request.

At 312, the master data engine 170 may send, to the production system 120, a corrected transport request in response to an indication from the production system 120 that one or more errors are present in the transport request. In some example embodiments, the production system 120 may request for a corrected transport request if the product system 120 is unable to successfully verify the contents of the transport request, for example, due to the absence of the portion of the shadow table 185 storing the replica of the first master data 180*a* associated with the customizations included in the transport request. In response to the production system 120 requesting a corrected transport request, the master data engine 170 may send, to the production system 120, a corrected transport request that has been extended to include the portion of the shadow table 185 absent from the original transport request. Sending the corrected transport request to the production system 120 may enable the customizations included in the transport request to be deployed at the production system 120.

Figure 4:
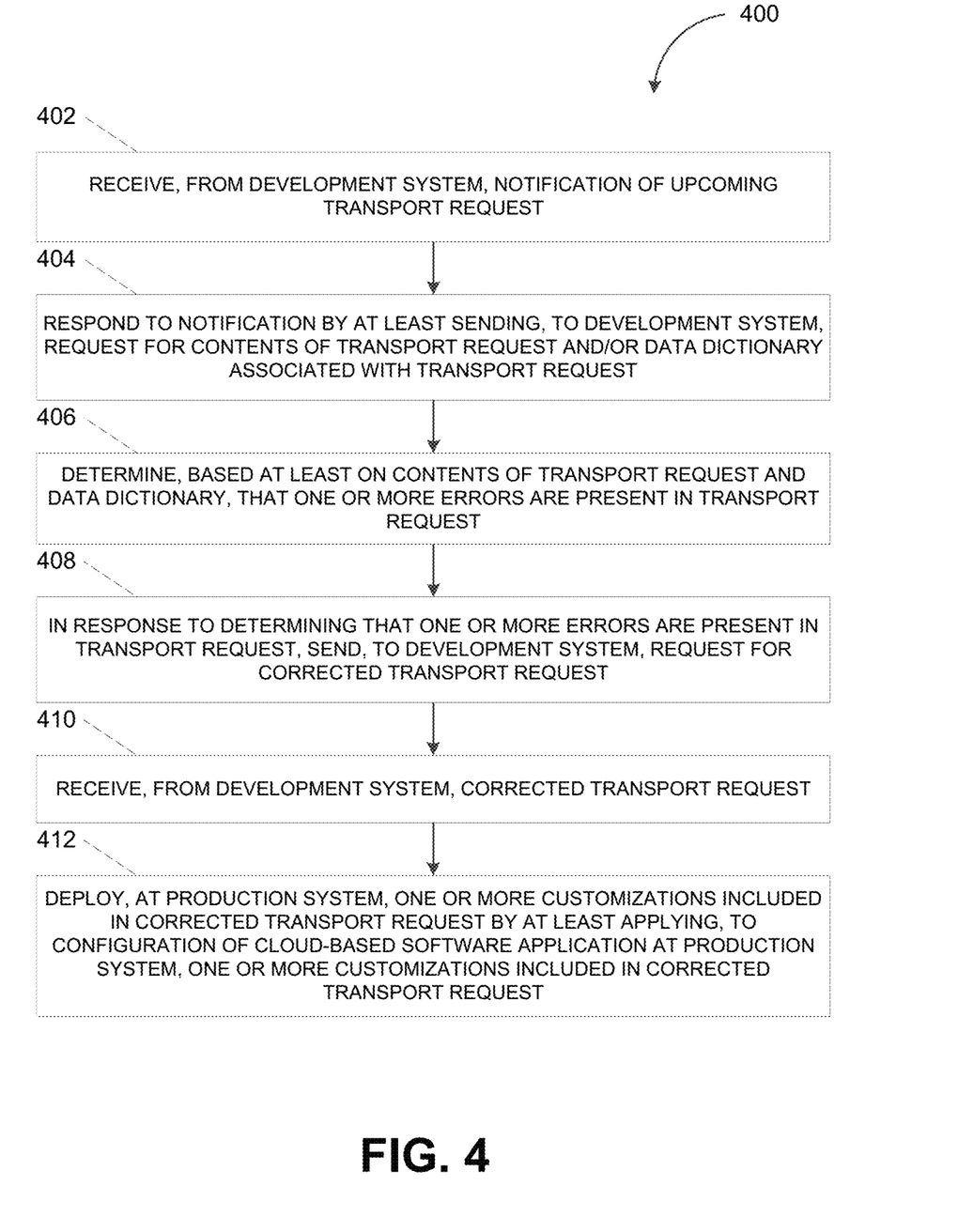
FIG. 4 depicts a flowchart illustrating a process for receiving customizations from a development system at a production system, in accordance with some example embodiments.

FIG. 4 depicts a flowchart illustrating a process 400 for receiving customizations from the development system 110 at the production system 120, in accordance with some example embodiments. Referring to FIGS. 1, 2A-B, and 4, the process 400 may be performed at the production system 120, for example, by the transport controller 150.

At 402, the transport controller 150 may receive, from the development system 110, a notification of an upcoming transport request. For example, the transport controller 150 at the production system 120 may receive, from the development system 110, a notification of an upcoming transport request prior to receiving the actual transport request.

At 404, the transport controller 150 may respond to the notification by at least sending, to the development system 110, a request for the contents of the transport request and/or a data dictionary associated with the transport request. In some example embodiments, the transport controller 150 at the production system 120 may respond to the notification from the development system 110 by at least requesting the development system 110 to send, to the production system 120, the contents of the transport request. The contents of the transport request may include, for example, customizations that add, remove, and/or modify a database table storing data that is operated upon by the second cloud-based software application 130*b* while performing a function. These customizations may further require modifications to the second master data 180*b* stored in the second database 125 at the production system 120. The second master data 180*b* may correspond to data that the second cloud-based software application 130*b* requires for performing the functions. At least a portion of the second master data 180*b* may be modified as a result of the customizations adding, removing, and/or modifying the database table storing the data operated upon by the second cloud-based software application 130*b*.

Alternatively and/or additionally, the transport controller 150 may respond to the notification of the upcoming transport request by at least sending, to the development system 110, a request for the data dictionary 155 associated with the transport request. The data dictionary 155 may store data dependencies such as, for example, the dependency between data that is operated upon by the second cloud-based software application 130*b* and the second master data 180*b*. For example, the data dictionary 155 may include keys that map entries from one database table storing the second master data 180*b* to entries in another database table storing data that is operated upon by the second cloud-based software application 130*b*. Accordingly, when verifying a transport request from the development system 110, the transport controller 150 may identify, based at least on the data dictionary 155, the portion of the second master data 180*b* that is affected by the customizations included in the transport request.

At 406, the transport controller 150 may determine, based at least on the contents of the transport request and the data dictionary, that one or more errors are present in the transport request. In some example embodiments, the one or more errors may include an absence of master data that is required for the cloud-based software application at the production system to operate in accordance with the customizations. For example, the transport controller 155 may determine, based at least on the data dictionary 155, the presence of an error in the transport request. The error may include an absence of the portion of the shadow table 185 storing a replica of at least the portion of the first master data 180*a* associated with the customizations included in the transport request. This portion of the shadow table 185 may further be missing from the second master data 180*b* in the second database 125. The second cloud-based software application 130*b* may be unable to operate in accordance with the customizations without the second master data 180*b* being synchronized with the first master data 180*a* to include the same changes that were applied to the first master data 180*a* for the customizations.

At 408, the transport controller 150 may respond to the presence of the one or more errors in the transport request by at least sending, to the development system 110, a request for a corrected transport request. In some example embodiments, if the transport controller 150 determines that the portion of the shadow table 185 is absent from the transport request, the transport controller 150 may request for the development system 110 to extend the transport request to include the missing portion of the shadow table 185.

At 410, the transport controller 150 may receive, from the development system 110, the corrected transport request. For example, the transport controller 150 may receive, from the development system 110, a corrected transport request, which may include the portion of the shadow table 185 storing a replica of at least the portion of the first master data 180*a* associated with the customizations included in the transport request.

At 412, the transport controller 150 may deploy, at the production system 120, the one or more customizations that are included in the corrected transport request by at least applying, to the second configuration 140*b* of the second cloud-based software application 130*b* at the production system 120, the one or more customizations included in the corrected transport request. In some example embodiments, applying the customizations at the production system 120 may add, remove, and/or modify the functions of the second cloud-based software application 130b, thereby adding, removing, and/or modifying one or more database tables storing data that the second cloud-based software application 130b operates upon when performing these functions. As noted, in order to perform the functions, the second cloud-based software application 130b may require the second master data 180b. Accordingly, applying the customizations at the production system 120 may include applying, to the second master data 180b, the corresponding changes.

Figure 5:
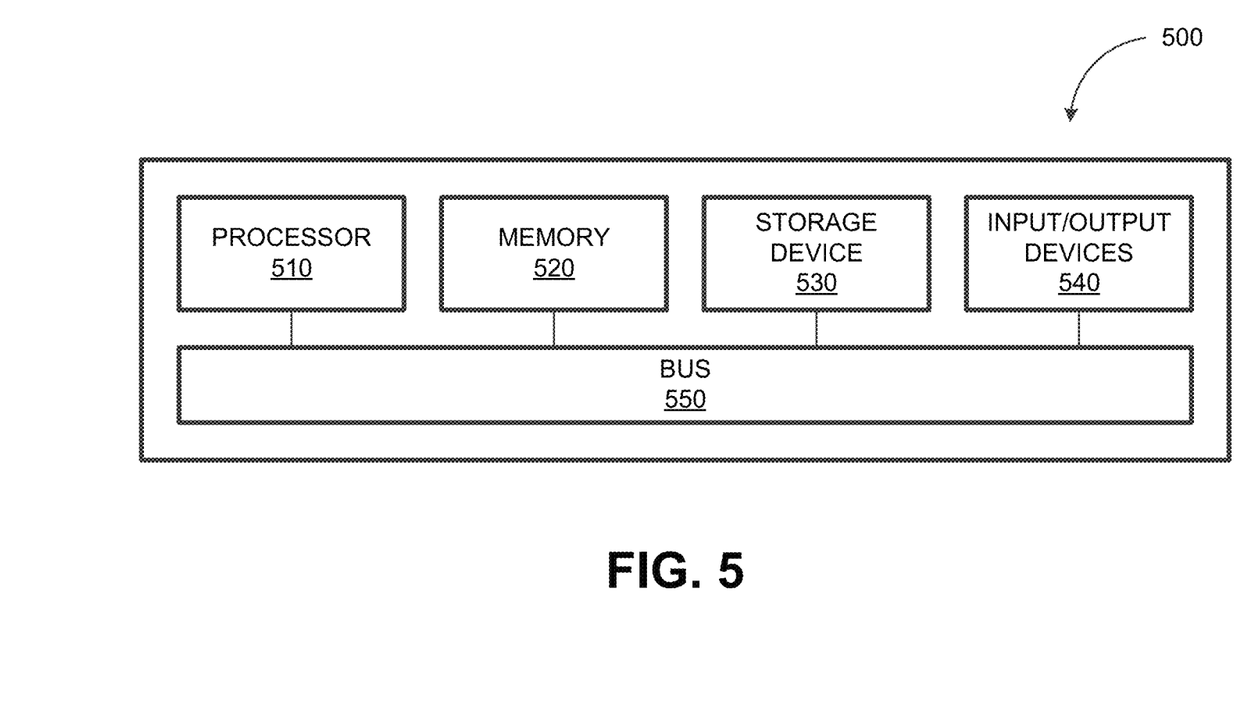
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-3, 4A-B, and 5, the computing system 500 can be used to implement the transport controller 150, the master data engine 170, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the transport controller 150 and/or the master data engine 170. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid-state device, a floppy disk device, a hard disk device, an optical disk device, a tape device, and/or any other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
      detecting, at a development system hosting a first software application, a change to a first database table storing a first master data associated with the first software application, the change corresponding to a customization applied to the first software application, and the first master data comprising data objects that the first software application requires for performing at least one function of the first software application;
      in response to detecting the change to the first database table, applying, at the development system hosting the first software application, the change to a second database table storing a replica of the first master data;
      generating, at the development system hosting the first software application, a transport request to include the customization and at least a portion of the second database table including the change;
      sending, to a production system, a notification that the transport request is being sent prior to sending the transport request to enable the production system to verify the contents of the transport request by at least checking, based on a data dictionary mapping at least the portion of the second database table including the change to a second master data operated on by a second software application at the production system;
      sending, to the production system hosting a second software application, the transport request in order to deploy the customization at the production system, in response to the production system successfully verifying contents of the transport request, wherein the transport request includes at least the portion of the second database table instead of base data for recreating, at the production system, the first database table corresponding to the first master data; and
      sending, to the production system, a corrected transport request in response to the production system determining that a corresponding portion of the second database table storing the replica of first master data required for the second software application to operate in accordance with the customization is absent from the transport request, the corrected transport request including the portion of the second database table absent from the transport request.

2. The system of claim 1, wherein the first software application operates on the first master data stored in the first database table in order to perform the at least one function, and wherein the performance of the at least one function generates transaction data that is stored in a third database table.

3. The system of claim 1, wherein the change is detected by a database trigger coupled with the first database table.

4. The system of claim 3, wherein the database trigger comprises an insertion trigger and/or an update trigger, and wherein the change comprises an insertion and/or an update of at least one data object in the first database table.

5. The system of claim 1, wherein the first software application and the second software application comprise different instances of a same cloud-based software application.

6. The system of claim 1, wherein the development system and the production system are deployed on a same cloud-computing platform or different cloud-computing platforms.

7. The system of claim 1, wherein the deploying of the customization at the production system includes synchronizing, with the first master data, a second master data associated with the second software application.

8. A computer-implemented method, comprising:
   detecting, at a development system hosting a first software application, a change to a first database table storing a first master data associated with the first software application, the change corresponding to a customization applied to the first software application, and the first master data comprising data objects that the first software application requires for performing at least one function of the first software application;
   in response to detecting the change to the first database table, applying, at the development system hosting the first software application, the change to a second database table storing a replica of the first master data;
   generating, at the development system hosting the first software application, a transport request to include the customization and at least a portion of the second database table including the change;
   sending, to a production system, a notification that the transport request is being sent prior to sending the transport request to enable the production system to verify the contents of the transport request by at least checking, based on a data dictionary mapping at least the portion of the second database table including the change to a second master data operated on by a second software application at the production system;
   sending, to the production system hosting a second software application, the transport request in order to deploy the customization at the production system, in response to the production system successfully verifying contents of the transport request, wherein the transport request includes at least the portion of the second database table instead of base data for recreating, at the production system, the first database table corresponding to the first master data; and sending, to the production system, a corrected transport request in response to the production system determining that a corresponding portion of the second database table storing the replica of first master data required for the second software application to operate in accordance with the customization is absent from the transport request, the corrected transport request including the portion of the second database table absent from the transport request.

9. The method of claim 8, wherein the first software application operates on the first master data stored in the first database table in order to perform the at least one function, and wherein the performance of the at least one function generates transaction data that is stored in a third database table.

10. The method of claim 8, wherein the change is detected by a database trigger coupled with the first database table.

11. The method of claim 10, wherein the database trigger comprises an insertion trigger and/or an update trigger, and wherein the change comprises an insertion and/or an update of at least one data object in the first database table.

12. The method of claim 8, wherein the first software application and the second software application comprise different instances of a same cloud-based software application.

13. The method of claim 8, wherein the development system and the production system are deployed on a same cloud-computing platform or different cloud-computing platforms.

14. The method of claim 8, wherein the deploying of the customization at the production system includes synchronizing, with the first master data, a second master data associated with the second software application.

15. A non-transitory computer-readable medium storing instructions, which when executed by at least one data processor, result in operations comprising:

detecting, at a development system hosting a first software application, a change to a first database table storing a first master data associated with the first software application, the change corresponding to a customization applied to the first software application, and the first master data comprising data objects that the first software application requires for performing at least one function of the first software application;

in response to detecting the change to the first database table, applying, at the development system hosting the first software application, the change to a second database table storing a replica of the first master data;

generating, at the development system hosting the first software application, a transport request to include the customization and at least a portion of the second database table including the change;

sending, to a production system, a notification that the transport request is being sent prior to sending the transport request to enable the production system to verify the contents of the transport request by at least checking, based on a data dictionary mapping at least the portion of the second database table including the change to a second master data operated on by a second software application at the production system;

sending, to the production system hosting a second software application, the transport request in order to deploy the customization at the production system, in response to the production system successfully verifying contents of the transport request, wherein the transport request includes at least the portion of the second database table instead of base data for recreating, at the production system, the first database table corresponding to the first master data; and sending, to the production system, a corrected transport request in response to the production system determining that a corresponding portion of the second database table storing the replica of first master data required for the second software application to operate in accordance with the customization is absent from the transport request, the corrected transport request including the portion of the second database table absent from the transport request.

\* \* \* \* \*